US010591333B2

(12) United States Patent
Schutze et al.

(10) Patent No.: US 10,591,333 B2
(45) Date of Patent: Mar. 17, 2020

(54) METHOD FOR AFFIXING A METAL TUBE TO A METAL BODY

(71) Applicant: Endress + Hauser Flowtec AG, Reinach (CH)

(72) Inventors: Christian Schutze, Basel (CH); Marcel Braun, Inzlingen (DE); Dirk Butzbach, Huningue (FR); Rainer Lorenz, Lorrach (DE)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 34 days.

(21) Appl. No.: 15/104,343

(22) PCT Filed: Nov. 17, 2014

(86) PCT No.: PCT/EP2014/074711
§ 371 (c)(1),
(2) Date: Jun. 14, 2016

(87) PCT Pub. No.: WO2015/090775
PCT Pub. Date: Jun. 25, 2015

(65) Prior Publication Data
US 2016/0313161 A1    Oct. 27, 2016

(30) Foreign Application Priority Data
Dec. 20, 2013 (DE) .................. 10 2013 114 742

(51) Int. Cl.
*B23K 20/12* (2006.01)
*G01F 1/84* (2006.01)
*B21D 39/04* (2006.01)

(52) U.S. Cl.
CPC .......... *G01F 1/8404* (2013.01); *B21D 39/04* (2013.01); *B23K 20/12* (2013.01); *G01F 1/8409* (2013.01)

(58) Field of Classification Search
None
See application file for complete search history.

(56) References Cited

U.S. PATENT DOCUMENTS

| 4,627,146 A | | 12/1986 | Ward | |
| 5,610,342 A | * | 3/1997 | Wenger | G01F 1/8409 73/861.354 |

(Continued)

FOREIGN PATENT DOCUMENTS

| CN | 1201903 A | 12/1998 |
| CN | 1462364 A | 12/2003 |

(Continued)

OTHER PUBLICATIONS

German Search Report, German Patent Office, Munich, DE, dated Oct. 8, 2014.

(Continued)

*Primary Examiner* — Devang R Patel
(74) *Attorney, Agent, or Firm* — Bacon & Thomas, PLLC

(57) ABSTRACT

In the method, a portion of the metal tube is placed in a lumen of a metal sleeve having a metal wall surrounding the lumen. The metal tube is placed in such a manner that an outer surface of the metal tube and an inner surface of the metal sleeve at least partially contact one another. The metal sleeve is affixed on the portion of the metal tube placed in its lumen for forming a metal tube, metal sleeve, composite system. The metal tube, metal sleeve, composite system, in turn, is placed in the passageway of the metal body in such a manner that an outer surface of the metal sleeve and an inner surface of the passageway at least partially contact one another, in order thereafter by plastically deforming at least the metal sleeve of the metal tube, metal sleeve, composite system placed in the passageway to form a force interlocking between the inner surface of the passageway and the outer surface of the metal sleeve. The so formed metal tube, (Continued)

metal sleeve, metal body composite system can serve as a component of a measuring transducer, respectively a vibronic measuring device formed therewith.

33 Claims, 6 Drawing Sheets

(56) References Cited

U.S. PATENT DOCUMENTS

| | | | |
|---|---|---|---|
| 6,519,828 B1 | 2/2003 | Cook | |
| 6,634,241 B1 | 10/2003 | Van Cleve | |
| 7,299,699 B2 | 11/2007 | Lorenz | |
| 2001/0035055 A1 | 11/2001 | Drahm | |
| 2005/0172731 A1* | 8/2005 | Anklin | B21D 39/06 |
| | | | 73/861.355 |
| 2006/0083941 A1* | 4/2006 | Lorenz | G01F 1/8404 |
| | | | 428/544 |
| 2007/0119264 A1* | 5/2007 | Bitto | G01F 1/8404 |
| | | | 73/861.357 |
| 2007/0234822 A1* | 10/2007 | Bitto | G01F 1/8409 |
| | | | 73/861.355 |
| 2008/0124186 A1 | 5/2008 | Binz | |
| 2008/0127719 A1 | 6/2008 | Drahm | |
| 2011/0016990 A1* | 1/2011 | Huber | G01F 1/8427 |
| | | | 73/861.357 |
| 2011/0023624 A1* | 2/2011 | Huber | G01F 1/8409 |
| | | | 73/861.357 |
| 2016/0313161 A1 | 10/2016 | Schutze | |

FOREIGN PATENT DOCUMENTS

| | | |
|---|---|---|
| CN | 1602412 A | 3/2005 |
| CN | 101072983 A | 11/2007 |
| DE | 3724675 A1 | 2/1989 |
| DE | 19637688 A1 | 3/1998 |
| DE | 102013114742 A1 | 6/2015 |
| EP | 1074821 A2 | 2/2001 |
| EP | 1914526 A1 | 4/2008 |
| GB | 2134614 A | 8/1984 |
| WO | 0225224 A1 | 3/2002 |
| WO | 2015090775 A1 | 6/2015 |

OTHER PUBLICATIONS

International Search Report, EPO, The Netherlands, dated Mar. 6, 2015.
English Translation of the International Preliminary Report on Patentability, WIPO, Geneva, CH, dated Jun. 30, 2016.
Office Action dated Apr. 23, I2019, in corresponding European application No. 14 802 377.3.

* cited by examiner

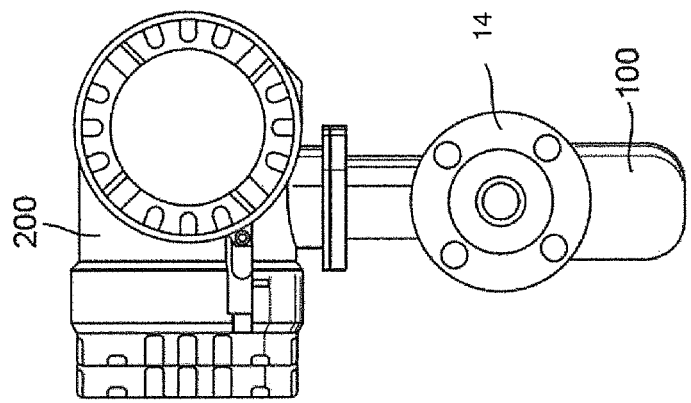
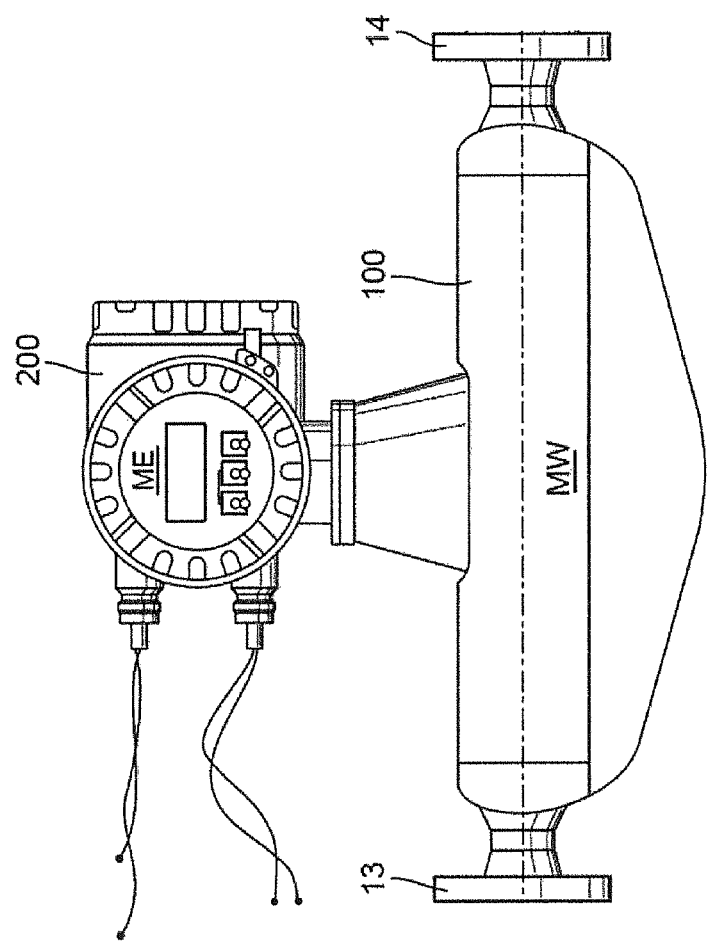
Fig. 2a
Fig. 2b

METHOD FOR AFFIXING A METAL TUBE TO A METAL BODY

TECHNICAL FIELD

The invention relates to a method for affixing by means of a force interlocked connection a metal tube, especially a metal tube useful as a measuring tube of a measuring transducer of the vibration-type, to a metal body having a passageway as well as to an assembly manufactured by means of such a method, consequently an assembly comprising both a metal body as well as also a metal tube. Moreover, the invention relates to a measuring transducer comprising such an assembly, especially namely a measuring transducer of the vibration-type formed by means of such an assembly, as well as to a vibronic measuring device, especially namely a Coriolis, mass flow, measuring device, a density measuring device, respectively a viscosity measuring device, for measuring a mass flow rate, a density and/or a viscosity of a flowable medium.

BACKGROUND DISCUSSION

Methods useful for affixing a metal tube, namely a tube having a lumen surrounded by a metal wall, to a metal body having a passageway, especially also in connection with the manufacture of measuring transducers of the vibration-type, are described in, among others, German patent, DE-A 102006011789, and U.S. Pat. Nos., US-A 2003/0084559, US-A 2005/0172731, US-A 2006/0083941, US-A 2007/0277624, US-A 2008/0124186, U.S. Pat. Nos. 5,610,342 or 6,047,457, not least of all also methods, in the case of which, first of all, a portion of the respective metal tube is placed in the passageway of the respective metal body, in such a manner that an outer surface of the metal tube and an inner surface of the passageway at least partially contact one another, and thereafter, by deformation of the respective metal body in such a manner that this durably introduces radial forces into the metal tube, a force-based interlocking affixing the metal tube to the metal body, respectively a composite system composed of metal body and metal tube, is formed. The principle construction as well as the principle operation, as well as also options of application of such measuring transducers of the vibration-type formed by means of at least one metal tube useful as measuring tube are known, per se, to those skilled in the art, not least of all also from the above cited German patent, DE-A 102006011789, and U.S. Pat. Nos., US-A 2003/0084559, US-A 2005/0172731, US-A 2006/0083941, US-A 2007/0277624, US-A 2008/0124186, U.S Pat. No. 5,610,342, respectively U.S. Pat. No. 6,047,457, however, among others, also from US-2011/0146416, US-A 2007/0151370, US-A 2007/0186685, US-A 2008/0127719, US-A 2010/0251830, US-A 2011/0265580, U.S. Pat. Nos. 5,796,011, or 6,006,609. As is known, the at least one metal tube serviceable as measuring tube in the case of such measuring transducers is, especially, adapted to guide in its lumen a fluid, for example, a gas, a liquid or a flowable dispersion, flowing at least at times, especially namely to be flowed through by the fluid and during that to be so caused to vibrate that the metal tube executes mechanical oscillations about a static resting position thereof, mechanical oscillations which are suitable to induce in the flowing fluid Coriolis forces dependent on a mass flow rate and/or frictional forces dependent on a viscosity and/or inertial forces dependent on a density, in order to ascertain, derived therefrom, measured values for the mass flow rate, the viscosity and the density, respectively.

For producing holding forces required for a force-based interlocking in a composite system of the previously indicated type in the case of a press method disclosed in U.S. Pat. No. 6,047,457, respectively US-A 2006/0083941, the respective metal body is cold formed by exerting over an outer surface of the metal body radially inwardly directed deformation forces on the metal body, in such case namely by means of a press machine acting on the metal body via press forms placed on the lateral surface of the metal body. The deformation forces are, in such case, so dimensioned that, as a result of the cold deformation of the metal body, the metal body as well as the metal tube experience, supplementally, elastic deformations, which, as a whole, suffice to establish holding forces between the inner surface of the passageway and the outer surface of the metal tube contacting such for preventing an undesired release of the force interlocking. In the case of another method shown, among others, in US-A 2003/0084559, respectively US-A 2006/0083941, for affixing the metal tube in the metal body, the metal body is for the purpose of forming a force locking with the respective measuring tube thermally shrunk thereon, in given cases, with interpositioning of a metal jacket applied on the metal tube. Furthermore, holding forces required for a force-based interlocking can also be produced by introducing a plastic deformation of the metal tube, in such a manner that the metal tube is widened by deformation forces acting radially outwardly on its inner surface. The widening of the metal tube can, in turn, occur by cold deformation, for example, such as, among others, also disclosed in German patent, DE-A 102006011789, hydraulically, namely by means of a pressurizing medium introduced into the lumen, or, however, for example, also, such as described in U.S. Pat No. 5,610,342, US-A 2006/0083941, respectively US-A 2005/0172731, by an internal rolling method. Used in the case of such an internal rolling method is a roll tool introduced into the lumen of the metal tube, which for effecting a partial plastic deformation of the wall is held pressed against the inner surface of the wall and during that guided along a roll track, for example, a circular, respectively screw thread shaped, roll track, extending within a predetermined deformation region of the metal tube, for example, namely over the total portion of the metal tube accommodated by the passageway of the metal body.

An advantage of such a force-based interlocking is, among other things, that therewith also a metal tube can be affixed to such a metal body, which is composed of a material, which cannot be connected with the material of the wall of the metal tube by material bonding, namely neither welded, nor soldered or brazed, respectively with which the metal tube cannot form a material bonded connection, respectively with which the metal tube can only with considerable technical effort form a fatigue resistant, material bonded connection. Particularly the above-mentioned internal rolling method, as well as also the above-mentioned external pressing method, have proven themselves as useful for the manufacture of measuring transducers of the vibration-type, especially also for affixing a metal tube useful as a measuring tube in a passageway of an end plate of a transducer housing, respectively of a metal body useful as support element. This not least of all also because both in the case of the internal rolling method, as well as also the press method, the particular force-based interlocking is introduced also by cold deformation of the measuring tube, respectively of the metal body, namely below a respective recrystallization temperature of the metal to be deformed, consequently each of the two methods is also performable at room temperature, respectively also without supply of heat. Moreover, by means of this method, sufficiently high holding forces, respectively holding forces exactly matched to the particular nominal diameters, can be achieved in very simple, equally as well effective, manner for producing a fatigue resistant connection between metal tube and metal body. Additionally, the so produced holding forces, consequently the therewith manufactured force-based interlocked connections, are not only highly loadable, but, instead, also reproducible within very narrow tolerance ranges, respectively tolerance ranges acceptable for high-quality, batch production. Moreover, neither in the case of the internal rolling nor in the case of the press method is the application of a pressurizing medium required, a pressurizing medium, in each case, to be filled into the metal tube to be processed, consequently a pressurizing medium causing increased technical effort.

A disadvantage of the above indicated methods known from the state of the art, respectively conventionally applied in the case of the manufacture of measuring transducers of the vibration-type, based on cold deformation of a metal body and/or a metal tube and serving for affixing the metal tube to the metal body, especially also the internal rolling method, as well as also the press method, is, however, to be found therein, that the wall of the respective metal tube, respectively the metal body, must for the purpose of establishing sufficiently high holding forces be deformed over a correspondingly large axially extending deformation region, namely a deformation region extending with a predeterminable length in the direction of an imaginary longitudinal axis of the metal tube. Since, on the one hand, the deformation region produces quite a mentionable contribution to the total length of the respective composite system, consequently to the installed length of a measuring transducer of the vibration-type formed therewith, while, on the other hand, measuring transducers of the vibration-type should typically have installed length to nominal diameter ratios of clearly less than 15:1, the length of the deformation region, which is obviously not usable for the actual oscillation measurement, is regularly so selected that it amounts to less than twice a caliber of the respective metal tube, while ideally corresponding only, for instance, to the caliber. Accordingly, an application of the actually very advantageous internal rolling method, as well as also the press method, is so far reserved for such composite systems, respectively therewith formed measuring transducers, in the case of which the particular metal tube has a wall thickness of greater than 1.5 mm as well as a caliber to wall thickness ratio, defined by a ratio of the caliber of the metal tube to its wall thickness, amounting to greater than 5, equally as well less than 30, ideally namely lying between 10 and 20.

Nevertheless, there is in increasing measure an interest also in having such measuring transducers of the vibration-type, consequently in such composite systems manufacturable by cold deformation, in the case of which the respective metal tubes useful as measuring tubes should have a wall thickness of less than 1.5 mm, respectively smaller than the respective caliber, consequently a caliber to wall thickness ratio of greater than 20, for example, for the purpose of improving measurement sensitivity and/or for the purpose of lessening a length of the respective measuring tube, in order, as a result, to be able to provide measuring transducers with shorter installed lengths, respectively also in the case of application of a sectionally bent measuring tube more compact measuring transducers than before.

SUMMARY OF THE INVENTION

An object of the invention is, consequently, to provide for affixing a metal tube to a metal body a method, which is suitable to affix to a metal body by means of force-based interlocking a metal tube serviceable as a measuring tube of a measuring transducer of the vibration-type and having a wall thickness of less than 2 mm, especially less than 1.5 mm, respectively a caliber to wall thickness ratio of greater than 20, respectively which is suitable to manufacture a force-based interlocking connection with holding forces increased in comparison to conventional force-based interlocking connections.

For achieving the object, the invention resides in a method for affixing a metal tube, for example, an at least sectionally circularly cylindrical, metal tube, namely a tube having a lumen surrounded by a metal wall, for example, a metal wall of stainless steel, titanium, zirconium, tantalum, a titanium alloy, a tantalum alloy, a zirconium alloy or a nickel based alloy, to a metal body having a passageway, for example, a metal body of steel, wherein the method of the invention comprises steps as follows:

placing a portion, for example, a terminal and/or circularly cylindrical portion, of the metal tube in a lumen of a metal sleeve (30), namely a sleeve, for example, a circularly cylindrical sleeve, having a metal wall, for example, a metal wall of stainless steel, titanium, zirconium, tantalum, a titanium alloy, a tantalum alloy, a zirconium alloy or a nickel based alloy, surrounding the lumen, in such a manner that an outer surface of the metal tube and an inner surface of the metal sleeve at least partially contact one another;

affixing the metal sleeve on the portion of the metal tube placed in its lumen for forming a metal tube, metal sleeve, composite system (10/30);

placing the metal tube, metal sleeve, composite system (10/30) in the passageway of the metal body in such a manner that an outer surface of the metal sleeve and an inner surface of the passageway at least partially contact one another; as well as plastically deforming, for example, namely cold deforming, at least the metal sleeve of the metal tube, metal sleeve, composite system placed in the passageway for forming a force interlocking between the inner surface of the passageway and the outer surface of the metal sleeve.

Furthermore, the invention resides in a metal tube, metal sleeve, metal body composite system comprising a metal tube, for example, a circularly cylindrical, metal tube, namely a tube having a lumen surrounded by a metal wall, a metal body having a passageway, as well as a metal sleeve, namely a sleeve having a metal wall surrounding the lumen, in the case of which composite system the metal tube is affixed to the metal body by means of a method of the invention.

Furthermore, the invention resides in a measuring transducer, for example, a measuring transducer of the vibration-type, comprising such a metal tube, metal sleeve, metal body composite system, wherein the metal tube is adapted to guide in its lumen a fluid, for example, a gas, a liquid or a flowable dispersion, for example, a fluid flowing at least at times.

Moreover, the invention resides in a vibronic measuring device, for example, a Coriolis mass flow measuring device, a density measuring device and/or a viscosity measuring device, for measuring at least one measured variable, for example, a mass flow rate, a density and/or a viscosity, of a fluid, for example, a gas, a liquid or a flowable dispersion, flowing, for example, in a connected pipeline, which measuring device comprises for guiding the fluid such a measuring transducer as well as a measuring- and operating electronics, for example, one formed by means of a microprocessor, electrically connected with the measuring transducer.

In a first embodiment of the method of the invention, the step of affixing the metal sleeve to the portion of the metal tube placed in its lumen comprises a step of forming a material bonded connection, for example, namely a welded connection, respectively a soldered or brazed connection, between the metal sleeve and the metal tube.

In a second embodiment of the method of the invention, the step of affixing the metal sleeve to the portion of the metal tube placed in its lumen comprises a step of soldering or brazing metal sleeve and metal tube.

In a third embodiment of the method of the invention, the step of affixing the metal sleeve to the portion of the metal tube placed in its lumen comprises a step of welding metal sleeve and metal tube.

In a fourth embodiment of the method of the invention, the step of plastically deforming at least the metal sleeve comprises a step of elastically deforming the portion of the metal tube placed in the lumen of the metal sleeve.

In a fifth embodiment of the method of the invention, the step of plastically deforming at least the metal sleeve comprises a step of widening, for example, radially widening, the metal tube, metal sleeve, composite system placed in the passageway.

In a sixth embodiment of the method of the invention, the step of plastically deforming at least the metal sleeve comprises a step of using a rolling tool provided in the lumen of the metal tube of the metal tube, metal sleeve, composite system placed in the passageway for widening of the metal tube, metal sleeve, composite system in the direction of the inner surface of the passageway.

In a seventh embodiment of the method of the invention, the step of plastically deforming at least the metal sleeve comprises a step of using a press tool placed on an outer surface of the metal body for pressing the metal body in the direction of the outer surface of the metal sleeve of the metal tube, metal sleeve, composite system placed in the passageway.

In an eighth embodiment of the method of the invention, it is provided that the wall of the metal tube has a wall thickness, which is less than 2 mm, for example, less than 1.5 mm.

In a ninth embodiment of the method of the invention, it is provided that the metal tube has a caliber, which is greater than 5 mm, for example, greater than 8 mm.

In a tenth embodiment of the method of the invention, it is provided that the metal tube has a caliber to wall thickness ratio, defined by a ratio of a caliber of the metal tube to a wall thickness of the wall the metal tube, which is greater than 20, for example, greater than 24.

In an $11^{th}$ embodiment of the method of the invention, it is provided that the wall of the metal sleeve has an initial wall thickness, which is greater than 1 mm, for example, greater than 2 mm, and/or which is greater than a wall thickness of the wall of the metal tube.

In a twelfth embodiment of the method of the invention, it is provided that the metal sleeve has an initial outer diameter, namely an outer diameter measurable before its plastic deformation, which is greater by at least 4 mm, for example, by more than 5 mm, than a caliber of the metal tube.

In a $13^{th}$ embodiment of the method of the invention, it is provided that the metal tube, metal sleeve, composite system has a total wall thickness, defined by a summation of a wall thickness of the wall of the metal tube and an initial wall thickness of the wall of the metal sleeve, which is greater than 2 mm, for example, greater than 3 mm. Developing this embodiment of the invention further, it is, additionally, provided that the metal tube, metal sleeve, composite system has a caliber to wall thickness ratio, defined by a ratio of a caliber of the metal tube to the total wall thickness of the metal tube, metal sleeve, composite system, which is less than 30, especially, however, greater than 5.

In a $14^{th}$ embodiment of the method of the invention, it is provided that the metal body is composed of a steel, for example, a stainless steel.

In a $15^{th}$ embodiment of the method of the invention, it is provided that the wall of the metal sleeve and wall of the metal body are of different materials.

In a $16^{th}$ embodiment of the method of the invention, it is provided that the wall of the metal tube and the wall of the metal body are of different materials.

In a $17^{th}$ embodiment of the method of the invention, it is provided that the wall of the metal sleeve and the wall of the metal tube are of equal material, for example, namely, in each case, of stainless steel, titanium, tantalum, zirconium, a titanium alloy, a tantalum alloy, a zirconium alloy or a nickel based alloy.

In an $18^{th}$ embodiment of the method of the invention, it is provided that the wall of the metal sleeve is composed of a material that is connectable by material bonding, for example, namely solderable or brazeable and/or weldable, with a material, of which the wall of the metal tube is composed.

In a $19^{th}$ embodiment of the method of the invention, it is provided that the portion of the metal tube is formed circularly cylindrically.

In a $20^{th}$ embodiment of the method of the invention, it is provided that the metal sleeve has an axial length, which is less than an axial length of the passageway.

In a $21^{st}$ embodiment of the method of the invention, it is provided that the metal sleeve has an axial length, which is less than an axial length of the metal tube.

In a $22^{nd}$ embodiment of the method of the invention, it is provided that the metal tube has an axial length, which is greater than an axial length of the passageway.

In a $23^{rd}$ embodiment of the method of the invention, it is provided that a longitudinal groove is present in the inner surface of the passageway In a $24^{th}$ embodiment of the method of the invention, it is provided that an annular groove is present in the inner surface of the passageway.

In a $25^{th}$ embodiment of the method of the invention, it is provided that an internal thread is formed in the inner surface of the passageway.

In a $26^{th}$ embodiment of the method of the invention, it is provided that an external thread is formed in the outer surface of the metal sleeve.

In a first further development of the method of the invention, such further comprises a step of elastically deforming the portion of the metal tube placed in the lumen of the metal sleeve for producing a deformation force sufficient for plastically deforming at least the metal sleeve, for example, a deformation force acting radially and/or in the direction of the inner surface of the passageway.

In a second further development of the method of the invention, such further comprises a step of plastically deforming, for example, cold deforming, also the metal tube of the metal tube, metal sleeve, composite system placed in the passageway for forming the force interlocking.

In a third further development of the method of the invention such further comprises a step of plastically deforming, for example, cold deforming, also the metal body for forming the force interlocking.

In a fourth further development of the method of the invention, such further comprises a step of introducing a rolling tool into the lumen of the metal tube of the metal tube, metal sleeve, composite system placed in the passageway.

In a fifth further development of the method of the invention, such further comprises a step of plastically deforming the metal body for producing a deformation force sufficient for plastically deforming at least the metal sleeve, for example, a deformation force acting radially and/or in the direction of the outer surface of the metal sleeve.

In a sixth further development of the method of the invention, such further comprises a step of setting a press tool on an outer surface of the metal body.

In an embodiment of the metal tube, metal sleeve, metal body composite system of the invention, it is provided that the portion of the metal tube borders on a portion of the metal tube extending outside of the lumen of the sleeve, consequently outside of the passageway and having, for example, an at least partially circular arc shape.

In an embodiment of the measuring transducer of the invention, it is provided that the at least one metal tube is further adapted to be flowed through by the fluid and during that to be caused to vibrate, for example, in such a manner that the metal tube executes mechanical oscillations about a static resting position associated therewith, mechanical oscillations which are suitable to induce in the flowing fluid Coriolis forces dependent on a mass flow rate, and/or that the metal tube executes mechanical oscillations about a static resting position associated therewith, which mechanical oscillations are suitable to induce in the flowing fluid frictional forces dependent on a viscosity of the fluid, and/or that the metal tube executes mechanical oscillations about a static resting position associated therewith, which mechanical oscillations are suitable to induce in the flowing fluid inertial forces dependent on a density of the fluid.

A basic idea of the invention is to compensate a dimensioning of the metal tube actually unsuitable for establishing holding forces sufficient for a force-based interlocking between metal tube and metal body based on cold deformation, for example, unsuitable due to a too small wall thickness, respectively a too large caliber to wall thickness ratio, wherein such compensation provides that on a portion of the metal tube, first of all, a metal sleeve is pushed on and that thereafter metal tube and metal sleeve are connected, for example, welded, respectively soldered or brazed, mechanically securely with one another to form a metal sleeve, metal tube, composite system in such a manner that, as a result, a total wall thickness, respectively a caliber to wall thickness ratio, of the metal sleeve, metal tube, composite system have sizes suitable for forming a force interlocking—namely, for example, sizes requiring only a relatively short deformation region. Then the so formed metal sleeve, metal tube, composite system, consequently the therein solidly anchored metal tube, can be affixed to the metal body by means of conventional, equally as well proven, apparatuses, respectively methods, in advantageous manner, namely also with application of an established internal rolling and/or press method, respectively also with application of apparatuses already adapted for such methods.

BRIEF DESCRIPTION OF THE DRAWINGS

The invention as well as other advantageous embodiments thereof will now be explained in greater detail based on examples of embodiments presented in figures of the drawing. Equal parts are provided in all figures with equal reference characters; when perspicuity requires or it otherwise appears sensible, already presented reference characters are omitted in subsequent figures. Other advantageous embodiments or further developments, especially also combinations, of, first of all, only individually explained aspects the invention result, furthermore, from the figures of the drawing, as well as also the dependent claims per se. The figures of the drawing show as follows:

FIGS. 2a, and 2b in different partially sectioned side views, show an example of an embodiment of a vibronic measuring device formed by means of a metal tube, metal sleeve, metal body composite system of FIGS. 1a, 1b;

DETAILED DISCUSSION IN CONJUNCTION WITH THE DRAWINGS

Figure 1B:
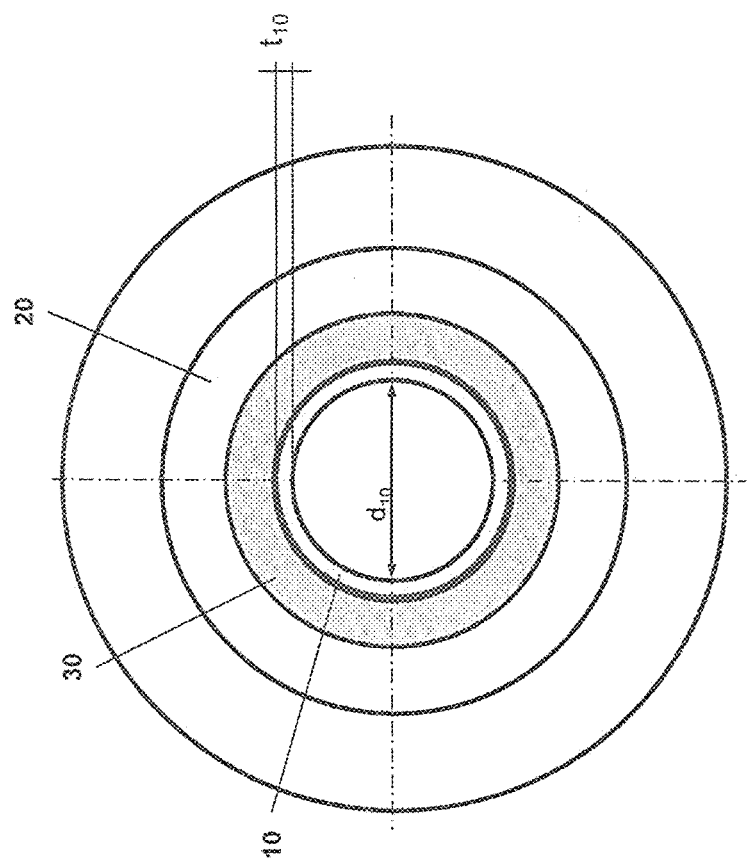
FIGS. 1a, and 1b in different partially sectioned side views, show an example of an embodiment of a metal tube, metal sleeve, metal body composite system, especially one suitable for application in a measuring transducer of vibration-type.
Figure 1A:
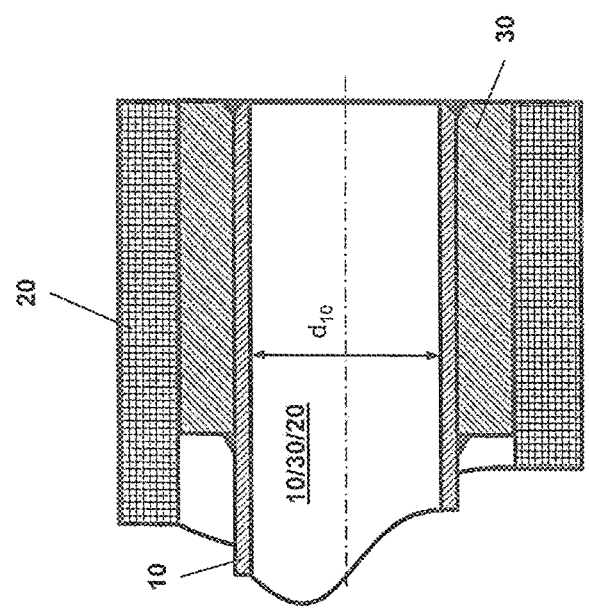

Shown schematically in FIGS. 1a and 1b are different partially sectioned views of a metal tube, metal sleeve, metal body composite system 10/30/20 formed by means of a metal tube 10, especially an at least sectionally circularly cylindrical, metal tube 10—namely a tube 10 having a lumen surrounded by a metal wall—, by means of a metal body 20, as well as by means of a metal sleeve 30—namely a sleeve having a lumen surrounded by a metal wall.

According to an embodiment of the invention, metal tube 10 is, especially, adapted to guide in its lumen a fluid, especially a fluid flowing at least at times, for example, a fluid in the form of a gas, a liquid or a flowable dispersion. The metal tube, metal sleeve, metal body composite system 10/30/20 can accordingly, such as evident from a combination of FIGS. 2a and 2b and 3, for example, also be a component of a measuring transducer MT, in the case of which composite system the metal tube serves as a measuring tube flowed through by the fluid, respectively a measuring device formed by means of such a measuring transducer, for instance, an in-line measuring device insertable into the course of a pipeline. Taking this into consideration, the wall of the metal tube according to an embodiment of the invention is composed of a material typical for measuring tubes applied in such measuring transducers, for example, namely a material such as titanium, tantalum, zirconium, a titanium alloy, a stainless steel, a tantalum alloy, a zirconium alloy or a nickel based alloy. In an additional embodiment of the invention, it is, furthermore, provided that the wall of the metal sleeve is composed of a material that is connectable by material bonding, especially namely solderable or brazeable and/or weldable, with the material, of which the wall of the metal tube is composed. In accordance therewith, the wall of the metal sleeve can, for example, also be of the same material as the wall of the metal tube.

Figure 3:
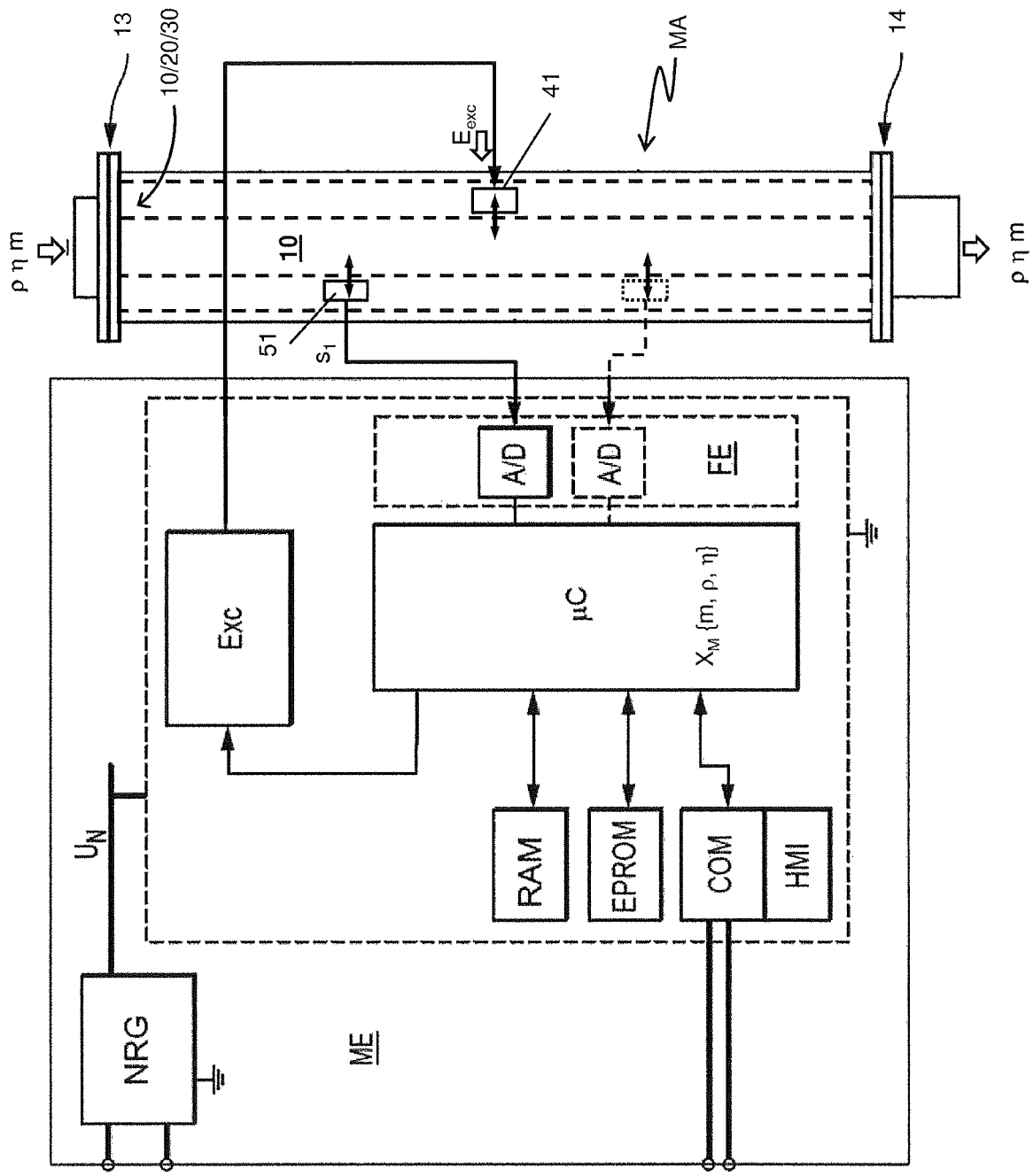
FIG. 3 schematically in the manner of a block diagram, shows an example of an embodiment of a vibronic measuring device with a measuring transducer of vibration-type as well as a measuring device electronics electrically connected therewith.

In an additional embodiment of the invention, the metal tube, metal sleeve, metal body composite system 10/30/20 is a component of a measuring transducer of the vibration-type, namely a measuring transducer MT, in the case of which the metal tube serviceable as a measuring tube is further adapted, to be flowed through by the fluid and during that to be caused to vibrate. This, especially, in such a manner that the metal tube, such as indicated in FIG. 3, executes mechanical oscillations about a static resting position associated therewith, mechanical oscillations which are suitable to induce in the flowing fluid Coriolis forces dependent on a mass flow rate m and/or frictional forces dependent on a viscosity η of the fluid and/or inertial forces dependent on a density ρ of the fluid. The measuring transducer MT can, for example, have a transducer housing 100 surrounding the metal tube and additionally be embodied, by means of connection flanges 13, 14 to be inserted into the course of a pipeline supplying, respectively draining, the fluid in such a manner that the metal tube 10, such as indicated in FIG. 3, communicates with the pipeline to form a traversing flow path.

By means of the measuring transducer MT, consequently by means of the metal body, metal sleeve, metal tube, composite system 10/20/30 contained therein, additionally a vibronic measuring device, for example, a Coriolis mass flow measuring device, a density measuring device or also a viscosity measuring device can be formed for ascertaining at least one measured variable, for example, a mass flow rate, a density and/or a viscosity, of a fluid, respectively for generating corresponding measured values X. For such purpose, the vibronic measuring device includes, furthermore, a measuring —and operating electronics ME, e.g. one formed by means of a microprocessor, which, such as evident from a combination of FIG. 2a, respectively 2b indicated, is accommodated in an electronics housing 200 and electrically connected with the measuring transducer, namely —, as well as also indicated in FIG. 3 —both with at least one oscillation exciter 41 of the measuring transducer serving for exciting and maintaining mechanical oscillations of the metal tube as well as also with at least one oscillation sensor 51 serving for registering mechanical oscillations of the metal tube and generating an oscillation measurement signal $s_1$ representing mechanical oscillations of the metal tube.

Particularly for the above indicated case, in which the metal tube 10 serves as measuring tube of a measuring transducer of the vibration-type, respectively a vibronic measuring device formed therewith, the metal sleeve 30 has an axial length, which, as well as also directly evident from FIG. 1a, has an axial length, which is less than that of the metal tube 10, respectively the axial length of the metal tube is greater than an axial length of the passageway. Moreover, the metal tube, metal sleeve, metal body composite system 10/30/20 is, according to an embodiment of the invention, furthermore, so embodied that the wall of the metal tube has a wall thickness $t_{10}$, which is less than 2 mm, especially also less than 1.5 mm, respectively the metal tube has a caliber to wall thickness ratio $d_{10}/t_{10}$, defined by a ratio of a caliber $d_{10}$ of the metal tube to the wall thickness $t_{10}$, which is greater than 20, especially greater than 24.

As evident from the combination of FIGS. 1a and 1b, in the case of the metal tube, metal sleeve, metal body composite system 10/30/20 of the invention, the metal tube is positioned with a—here terminal, respectively circularly cylindrical—portion in the lumen of the metal sleeve in such a manner that the metal sleeve surrounds the metal tube, respectively that an outer surface of the metal tube and an inner surface of the metal sleeve at least partially contact one another. Furthermore, the metal body of the metal tube, metal sleeve, metal body composite system 10/30/20 includes a passageway, in which the metal sleeve 30 together with the metal tube 10 are positioned in such a manner that an outer surface of the metal sleeve and an inner surface of the passageway at least partially contact one another.

The metal tube 10 of the metal tube, metal sleeve, metal body composite system 10/30/20 of the invention can, for example, be a traversingly straight, hollow, cylindrical pipe. It can, however, for example, also be curved in such a manner that the portion of the metal tube positioned within the metal sleeve, respectively within the passageway, is cylindrically hollow and borders on a portion of the metal tube extending outside of the lumen of the sleeve, consequently outside of the passageway, which outside portion is at least partially curved, especially circular arc shaped. Furthermore, it can, not least of all for the above indicated case, in which the metal tube serves as measuring tube of a measuring transducer of vibration-type, be quite advantageous to so dimension metal sleeve and passageway that the metal sleeve has an axial length, which is less than the axial length of the passageway.

Figure 4A:
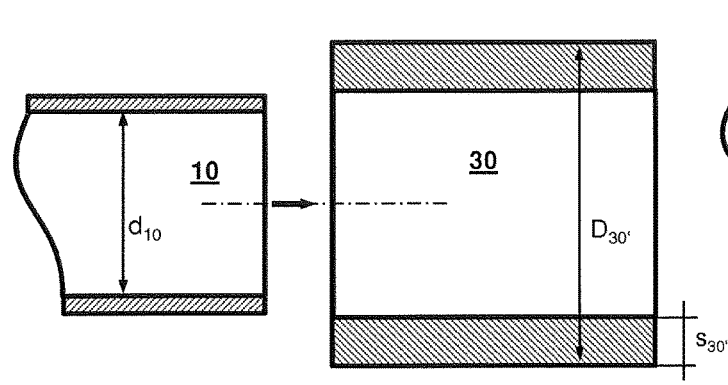
FIGS. 4a to 4d schematically, steps of a method for affixing a metal tube to a metal body, respectively for forming a metal tube, metal sleeve, metal body composite system of FIGS. 1a and 1b.
Figure 4B:
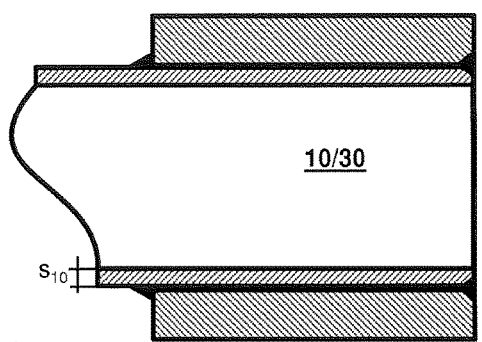
Figure 4C:
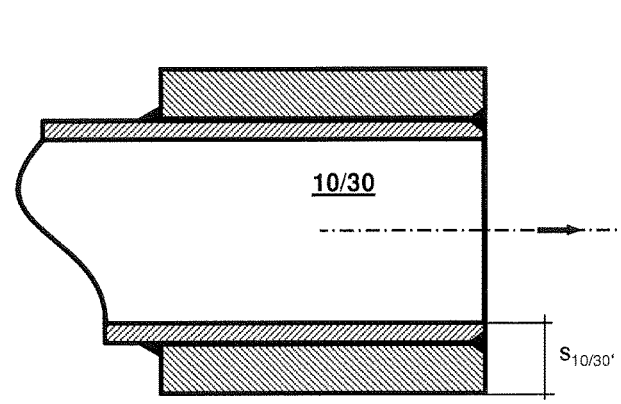
Figure 4D:
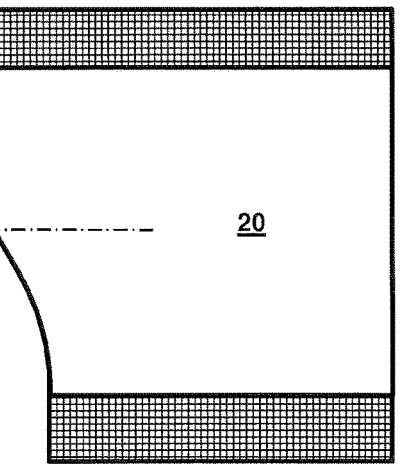
Figure 4D:
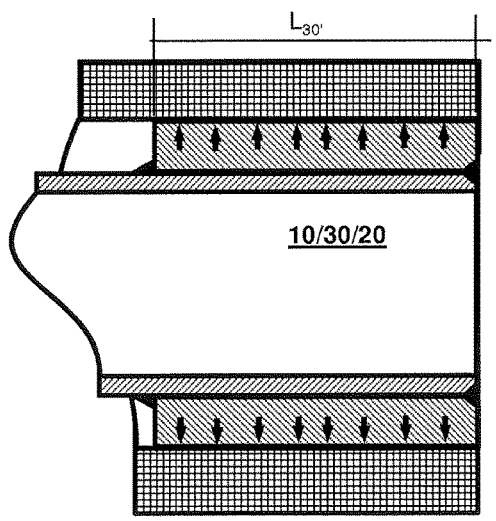

For manufacture of the metal tube, metal sleeve, metal body composite system 10/30/20, consequently for affixing the metal tube to the metal body, such as indicated schematically in FIG. 4a, first of all, the portion of the metal tube is so placed in the lumen of the metal sleeve 30 that the outer surface of the metal tube and the inner surface of the metal sleeve at least partially contact one another, in order thereafter to affix the metal sleeve to the portion of the metal tube placed in its lumen in order to form a metal tube, metal sleeve, composite system 10/30 (FIG. 4b). The affixing of the metal sleeve to the portion of the metal tube placed in its lumen occurs according to an embodiment of the invention by forming a material bonded connection between the metal sleeve and the metal tube 10 introduced into its lumen, for example, namely, as well as also indicated in FIG. 4b, by means of a welded connection, respectively a soldered or brazed connection. The so formed metal tube, metal sleeve, composite system 10/30, for example, thus by soldering, brazing, respectively welding metal sleeve and metal tube, is, such as schematically indicated in FIG. 4c, thereafter placed in the passageway of the metal body 20 in such a manner that the outer surface of the metal sleeve and the inner surface of the passageway, as a result, at least partially contact one another. After the metal tube, metal sleeve, composite system 10/30 is positioned within the passageway of the metal body, according to the invention, as well as also shown in FIG. 4d symbolized by means of arrows, at least the metal sleeve of the metal tube, metal sleeve, composite system 10/30 placed in the passageway is plastically deformed in such a manner that, as a result, a force-based interlocking between the inner surface of the passageway and the outer surface of the metal sleeve forms, consequently the metal tube, metal sleeve, metal body composite system 10/30 is produced. The so introduced plastic deformation of the metal sleeve 30 is, in such case, limited to a predetermined, respectively reserved, deformation region of the metal sleeve 30, which extends axially, namely in the direction of an imaginary longitudinal axis of the metal sleeve, respectively of the therewith ultimately formed metal tube, metal sleeve, metal body composite system 10/30/20 with a predetermined region length $L_{30'}$. In the case of the metal tube, metal sleeve, metal body composite system 10/30/20 shown in FIG. 4d, the region length $L_{30'}$ corresponds, for practical purposes, to a total length of the metal sleeve. On the basis of these considerations, the deformation region can, not least of all for the case, in which the axial length of the metal sleeve is less than the axial length of the passageway, extend, for example, also over the entire metal sleeve 30.

The plastic deformation can occur, for example, using cold deformation, namely a deformation below a recrystallization temperature of the metal of the wall of the metal sleeve, especially namely also at room temperature. Enabled in this way is use of a metal body of a material, which, on the one hand, is different from the respective material of the wall of the metal tube, respectively the metal sleeve, that, however, moreover, need not necessarily be solderable, brazable or weldable with the material of the wall of the metal sleeve. As a result of this, the metal body can, for example, also then be of a cost effective steel, in given cases, also a stainless steel, even though the wall of the metal tube, respectively the metal sleeve is composed, for example, of titanium, tantalum, respectively one of their alloys.

In order to assure, on the one hand, that the metal sleeve 30 is sufficiently plastically deformable for a lasting, especially also fatigue resistant, force-based interlocking, on the other hand, however, that the metal tube 10 experiences only an as small as possible, respectively ideally no, plastic deformation, according to an additional embodiment of the invention, an initial wall thickness $t_{30}'$ of the wall of the metal sleeve 30, namely a wall thickness $t_{30'}$ of the wall of the metal sleeve 30 measurable before the plastic deformation of the metal sleeve, is selected greater than 1 mm, especially greater than 2 mm, respectively the initial wall thickness $t_{30'}$, as well as also indicated in FIG. 4a, respectively 4b, in each case, is so selected that it is greater than a wall thickness $t_{10}$ of the wall of the metal tube; this, especially also in such a manner that the metal sleeve has an initial outer diameter $D_{30'}$, namely an outer diameter $D_{30'}$ measurable before its plastic deformation, which is greater by at least 4 mm, especially by more than 5 mm, than a caliber $D_{10}$ of the metal tube. In an additional embodiment of the invention, the metal tube, metal sleeve, composite system 10/30/20 includes for the purpose of achieving sufficiently high holding forces by the force-based interlocking a total wall thickness $t_{10/30'}$, which is greater than 2 mm, especially greater than 3 mm, respectively the metal tube, metal sleeve, composite system 10/30/20 has a caliber to wall thickness ratio $d_{10}/t_{10/30'}$, which is less than 30, especially less than 25. The total wall thickness $t_{10/30'}$ corresponds, in such case, to a sum of a wall thickness $t_{10}$ of the wall of the metal tube and an initial wall thickness $t_{30'}$ of the wall of the metal sleeve, namely a wall thickness measurable before its plastic deformation, while the caliber to wall thickness ratio $d_{10}/t_{10/30'}$ corresponds to a ratio of a caliber $d_{10}$ of the metal tube to the total wall thickness $t_{10/30'}$ of the metal tube, metal sleeve, composite system. Particularly for the case, in which the metal tube, metal sleeve, metal body composite system 10/30/20 of the invention serves as a component of a measuring transducer of vibration-type, consequently the metal tube serves as a measuring tube, it can for the purpose of an additional increasing of the established holding forces by the plastic deformation of the metal sleeve be additionally advantageous, supplementally to the so formed force-based interlocking, also to include a shape-based interlocking acting in the axial direction, for example, by, as well as also provided in the above-cited US-A 2006/0083941, including in the inner surface of the passageway an annular groove, respectively an internal thread, and/or by forming an external thread in the outer surface of the metal sleeve. Alternatively thereto or in supplementation thereof, additionally also a shape interlocking opposing a twisting of the metal tube, metal sleeve, composite system relative to the metal body can be embodied, for example, by, as well as also provided in the above-cited US-A 2005/0172731, forming a longitudinal groove in the inner surface of the passageway of the metal body.

Figure 5B:
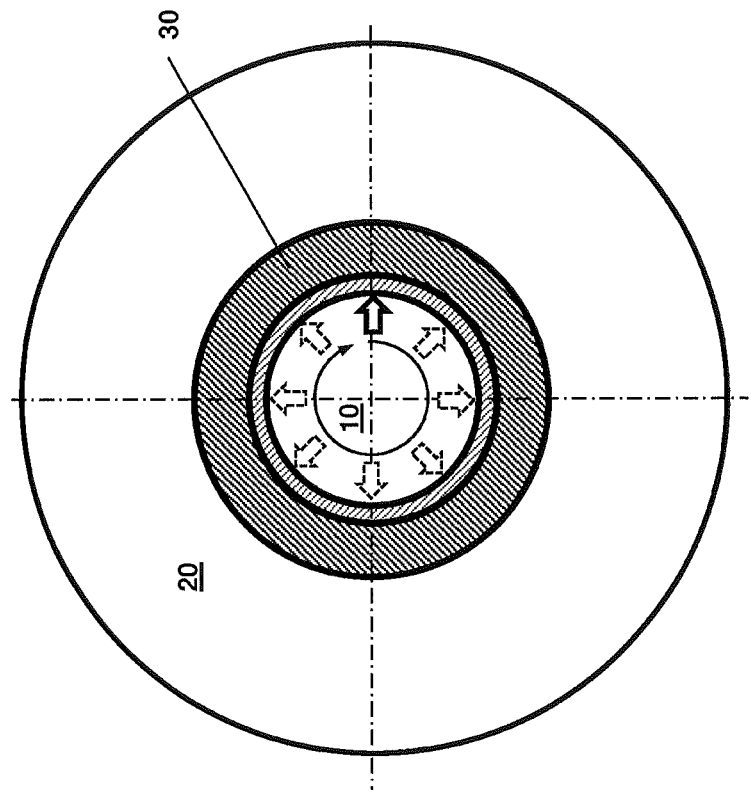
FIGS. 5a, and 5b schematically, a variant for the method shown in FIGS. 4a-4d.
Figure 5A:
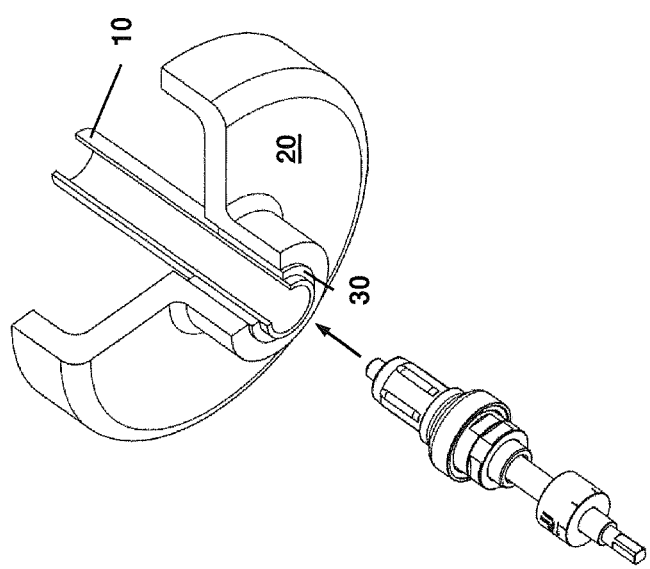

For producing deformation forces for plastically deforming at least the metal sleeve 30 sufficiently—, for example, forces acting radially, respectively in the direction of the inner surface of the passageway—the metal tube, metal sleeve, composite system 10/30 can e.g. be widened radially, for instance, by correspondingly elastically deforming the portion of the metal tube placed in the lumen of the metal sleeve 10; this, for example, until as a result of an elastic deformation effecting radial return forces associated with the widening of the metal tube, metal sleeve, composite system 10/30, also the metal body achieves the holding forces desired as a whole for the force-based interlocking. Therefore, according to an additional embodiment of the invention, it is provided that the plastic deformation at least of the metal sleeve occurs, in that the portion of the metal tube placed in the lumen of the metal sleeve is elastically deformed, respectively in that the metal tube, metal sleeve, composite system placed in the passageway 10/30 is widened radially, consequently in the direction of the inner surface of the passageway. Said widening of the metal tube, metal sleeve, composite system 10/30 can, such as indicated in FIG. 5a, occur, for example, with application of a rolling tool provided in the lumen of the metal tube of the metal tube, metal sleeve, composite system placed in the passageway. The rolling tool, such as symbolized by means of arrows in FIG. 5b, for effecting partial plastic deformation at least of the metal sleeve 30, is held pressed against the inner surface of the wall and, during that, guided along a, for example, circular, respectively screw thread shaped, roll track extending within the portion of the metal tube 10. Accordingly, for affixing the metal tube, metal sleeve, composite system positioned in the passageway of the metal body, for example, also a method comparable with an internal rolling method shown in the above-cited U.S. Pat. No. 5,610,342, US-A 2006/0083941, respectively US-A 2005/0172731, can be applied, in given cases, also by applying operating equipment already established for such an internal rolling method. In order, on the one hand, to enable a positioning, respectively handling, of the above indicated rolling tool in the lumen of the metal tube, on the other hand, however, also to be able to produce sufficiently high deformation forces for a widening, according to an additional embodiment of the invention, it is provided that the metal tube has a caliber $d_{10}$, which is greater than 5 mm, especially greater than 8 mm. Very good results, not least of all also as regards the holding forces, can, in such case, especially, also be achieved for cases, in which the above mentioned caliber to wall thickness ratio $d_{10}/t_{10/30'}$ of the metal tube, metal sleeve, composite system is selected greater than 10, at least, however, greater than 5.

Figure 6B:
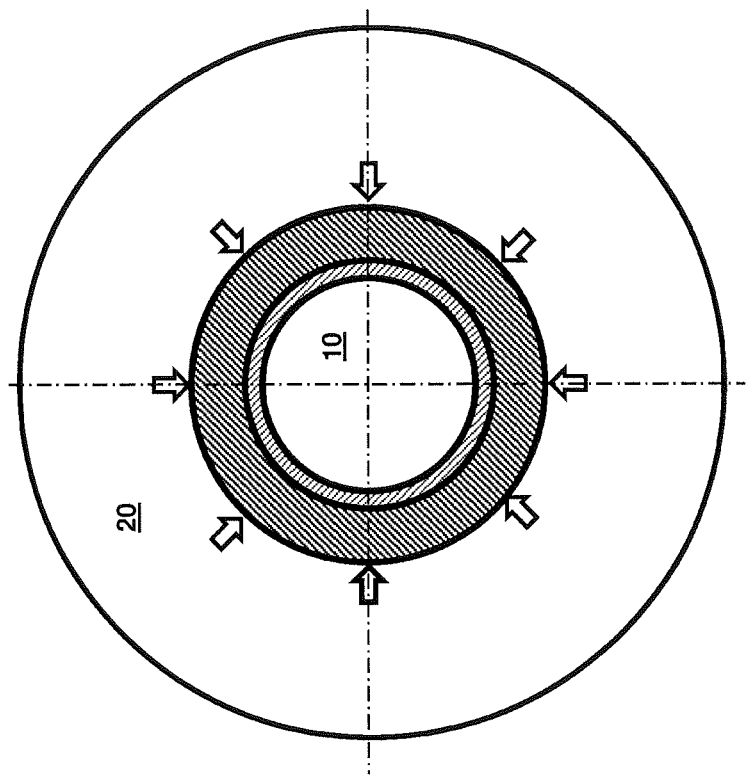
FIGS. 6a, and 6b schematically, another variant for the method shown in FIGS. 4a-4d.
Figure 6A:
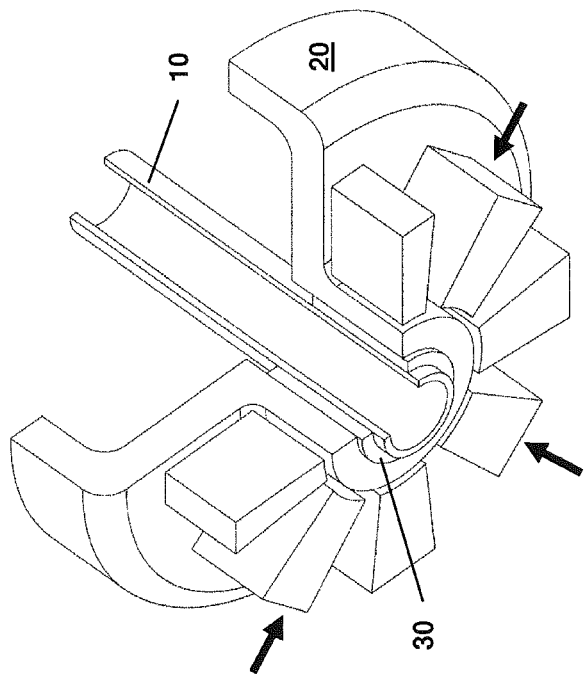

Alternatively or supplementally to the above indicated widening of the metal tube, metal sleeve, composite system, there is another opportunity for producing deformation forces sufficient for plastically deforming of the metal sleeve 30, among other things, also by plastically deforming the metal body, for example, by cold deformation, after the metal tube, metal sleeve, composite system has been placed in the passageway. This can occur, for example, with application of a press method shown in the above-cited U.S. Pat. No. 6,047,457, respectively US-A 2006/0083941, in such a manner that for plastically deforming the metal sleeve 30 of the metal tube, metal sleeve, composite system 10/30 located in the passageway, together with the metal body 20, such as schematically shown in FIG. 6a, first of all, a press tool is placed on an outer surface of the metal body and thereafter by means of the press tool the metal body is pressed in the direction of the outer surface of the metal sleeve of the metal tube, metal sleeve, composite system placed in the passageway, and, indeed, until, as a result, the metal body is pressed together with the metal tube, metal sleeve, composite system 10/30 and, in such case, at least also the metal sleeve 30 experiences corresponding plastic deformation; this, for example in such a manner that, as a result, the metal sleeve 30 and/or the metal tube 10 experience corresponding elastic deformations forming return forces, namely return forces holding the metal tube, metal sleeve, composite system pressed against the metal body, in order to form the force interlocking.

The invention claimed is:

1. A method for affixing a metal tube, namely a tube including a lumen surrounded by a metal wall, to a metal body including a passageway, wherein the metal tube shows a caliber to wall thickness ratio, defined by a ratio of a caliber of the metal tube to a wall thickness of the wall of the metal tube, which caliber to wall thickness ratio is greater than 20, said method comprising:
   placing a portion, of the metal tube in a lumen of a metal sleeve, namely a sleeve, including a metal wall, surrounding the lumen, in such a manner that an outer surface of the metal tube and an inner surface of the metal sleeve at least partially contact one another;
   affixing the metal sleeve on the portion of the metal tube placed in its lumen for forming a metal tube, metal sleeve, composite system, said affixing the metal sleeve to the portion of the metal tube placed in its lumen including forming a material bonded connection between the metal sleeve and the metal tube;
   placing the metal tube, metal sleeve, composite system in the passageway of the metal body in such a manner that an outer surface of the metal sleeve and an inner surface of the passageway at least partially contact one another; and
   plastically deforming, at least the metal sleeve of the metal tube, metal sleeve, composite system placed in the passageway of the metal body for forming a force interlocking between the inner surface of the passageway and the outer surface of the metal sleeve;
   wherein the metal sleeve shows an initial outer diameter, namely an outer diameter measurable before its plastic deformation, which is greater by at least 4 mm than a caliber of the metal tube.

2. The method as claimed in claim 1, wherein:
   said forming the material bonded connection between the metal sleeve and the metal tube for affixing the metal sleeve to the portion of the metal tube placed in its lumen comprises forming between the metal sleeve and the metal tube at least one of: a welded connection, a soldered and a brazed connection.

3. The method according to claim 1, wherein:
   said affixing the metal sleeve to the portion of the metal tube placed in its lumen comprises at least one of: soldering metal sleeve and metal tube, brazing metal sleeve and metal tube and welding metal sleeve and metal tube.

4. The method as claimed in claim 1, further comprising:
   elastically deforming the portion of the metal tube placed in the lumen of the metal sleeve for producing a deformation force, sufficient for plastically deforming at least the metal sleeve.

5. The method as claimed in claim 1, further comprising:
   plastically deforming, also the metal tube of the metal tube, metal sleeve, composite system placed in the passageway, in order to form the force interlocking.

6. The method as claimed in claim 1, further comprising:
   plastically deforming, also the metal body for forming the force interlocking.

7. The method as claimed in claim 1, wherein:
   said plastically deforming at least the metal sleeve comprises a elastically deforming the portion of the metal tube placed in the lumen of the metal sleeve.

8. The method as claimed in claim 1, wherein:
   plastically deforming at least the metal sleeve comprises a widening, the metal tube, metal sleeve, composite system placed in the passageway.

9. The method as claimed in claim 1, wherein:
   said plastically deforming at least the metal sleeve comprises using a rolling tool provided in the lumen of the metal tube of the metal tube, metal sleeve, composite system placed in the passageway, in order to widen the metal tube, metal sleeve, composite system in the direction of the inner surface of the passageway.

10. The method as claimed in claim 1, further comprising:
    introducing a rolling tool into the lumen of the metal tube of the metal tube, metal sleeve, composite system placed in the passageway.

11. The method as claimed in claim 1, further comprising:
    plastically deforming the metal body for producing a deformation force sufficient for plastically deforming at least the metal sleeve.

12. The method as claimed in claim 1, further comprising:
    applying a press tool on an outer surface of the metal body.

13. The method as claimed in claim 1, wherein:
    said plastically deforming at least the metal sleeve comprises using a press tool placed on an outer surface of the metal body for pressing the metal body in the direction of the outer surface of the metal sleeve of the metal tube, metal sleeve, composite system placed in the passageway.

14. The method as claimed in claim 1, wherein:
    the wall of the metal tube shows a wall thickness, which is less than 2 mm.

15. The method as claimed in claim 1, wherein:
    the wall of the metal sleeve shows an initial wall thickness which is greater than 1 mm.

16. The method as claimed in claim 1, wherein:
    the metal tube, metal sleeve, composite system shows a total wall thickness, defined by a summation of a wall thickness of the wall of the metal tube and an initial wall thickness of the wall of the metal sleeve, which total wall thickness is greater than 2 mm.

17. The method as claimed in claim 16, wherein:
the metal tube, metal sleeve, composite system shows a caliber to wall thickness ratio, defined by a ratio of a caliber of the metal tube to the total wall thickness of the metal tube, metal sleeve, composite system, which caliber to wall thickness ratio is less than 30.

18. The method as claimed in claim 17, wherein:
the metal tube, metal sleeve, composite system shows a caliber to wall thickness ratio greater than 5.

19. The method as claimed in claim 1, wherein:
the metal body is composed of a steel.

20. The method as claimed in claim 1, wherein:
the wall of the metal sleeve and the wall of the metal tube of are equal material.

21. The method as claimed in claim 1, wherein:
the portion of the metal tube is formed circularly cylindrically.

22. The method as claimed in claim 1, wherein:
at least one of a longitudinal groove, an annular groove and an internal thread is formed in the inner surface of the passageway.

23. The method as claimed in claim 1, wherein:
the metal shows a caliber to wall thickness ratio, which is greater than 24.

24. The method as claimed in claim 1, wherein:
the wall of the metal sleeve is composed of a material that is solderable with a material, of which the wall of the metal tube is composed.

25. The method as claimed in claim 1, wherein:
the wall of the metal sleeve is composed of a material that is brazeable with a material, of which the wall of the metal tube is composed.

26. The method as claimed in claim 1, wherein:
the wall of the metal sleeve is composed of a material that is weldable with a material, of which the wall of the metal tube is composed.

27. The method as claimed in claim 1, wherein:
the wall of the metal sleeve and wall of the metal body are of different materials.

28. The method as claimed in claim 1, wherein:
the wall of the metal tube and the wall of the metal body are of different materials.

29. The method as claimed in claim 1, wherein:
the metal tube shows a caliber, which is greater than 5 mm.

30. The method as claimed in claim 17, wherein:
the caliber to wall thickness ratio is less than 25.

31. The method as claimed in claim 1, wherein:
the wall of the metal sleeve shows an initial wall thickness, which is greater than a wall thickness the wall of the metal tube.

32. The method as claimed in claim 1, wherein:
the metal sleeve shows an axial length, which is less than an axial length of the metal tube.

33. The method as claimed in claim 1, wherein:
an external thread is formed in the outer surface of the metal sleeve.

* * * * *